(12) United States Patent
Warkander

(10) Patent No.: US 10,486,000 B2
(45) Date of Patent: Nov. 26, 2019

(54) TEMPERATURE-BASED ESTIMATION OF SCRUBBING CAPACITY OF A GAS SCRUBBER

(71) Applicant: Absorbergauge LLC, Oakwood, OH (US)

(72) Inventor: Dan Warkander, Oakwood, OH (US)

( * ) Notice: Subject to any disclaimer, the term of this patent is extended or adjusted under 35 U.S.C. 154(b) by 0 days.

(21) Appl. No.: 16/090,502

(22) PCT Filed: Apr. 8, 2017

(86) PCT No.: PCT/US2017/026729
§ 371 (c)(1),
(2) Date: Oct. 1, 2018

(87) PCT Pub. No.: WO2017/177212
PCT Pub. Date: Oct. 12, 2017

(65) Prior Publication Data
US 2019/0111287 A1    Apr. 18, 2019

Related U.S. Application Data

(60) Provisional application No. 62/320,415, filed on Apr. 8, 2016.

(51) Int. Cl.
*A62B 9/00* (2006.01)
*A62B 19/00* (2006.01)
(Continued)

(52) U.S. Cl.
CPC ............ *A62B 9/006* (2013.01); *A62B 18/088* (2013.01); *A62B 19/00* (2013.01); *B01D 53/62* (2013.01);
(Continued)

(58) Field of Classification Search
CPC ....... A62B 9/006; A62B 19/006; B01D 53/62; B01D 53/82; B01D 2251/304;
(Continued)

(56) References Cited

U.S. PATENT DOCUMENTS 4,146,887 A   3/1979   Magnante
4,154,586 A   5/1979   Jones et al.
(Continued)

FOREIGN PATENT DOCUMENTS

EP   1316331 B1   7/2007

OTHER PUBLICATIONS

Nuckles et al., Life Support Systems Design, pp. 105-110 1996.

*Primary Examiner* — Janet L Suglo
*Assistant Examiner* — Douglas Kay
(74) *Attorney, Agent, or Firm* — Hodgson Russ LLP

(57) ABSTRACT

Methods and systems for estimating remaining or utilized scrubbing capacity of a gas scrubber are described. Inside the gas scrubber, a reaction gas is produced by an exothermic or endothermic reaction. Temperature sensors are positioned along the gas flow path, and temperature readings are obtained. Temperature differences between pairs of adjacent temperature sensors are determined. The largest temperature difference for each such pair is recorded. A recent temperature difference is normalized by dividing the recent difference by the largest recorded for the same pair. One or more of the normalized temperature differences may be weighted. The normalized temperature differences and/or the weighted temperature differences are combined to provide a life-value, which is indicative of the remaining or utilized scrubbing capacity of the gas scrubber.

18 Claims, 7 Drawing Sheets

(51) Int. Cl.
  *B01D 53/62* (2006.01)
  *B01D 53/82* (2006.01)
  *G01K 17/08* (2006.01)
  *A62B 18/08* (2006.01)
(52) U.S. Cl.
  CPC ............. *B01D 53/82* (2013.01); *G01K 17/08* (2013.01); *B01D 2251/304* (2013.01); *B01D 2251/306* (2013.01); *B01D 2251/604* (2013.01); *B01D 2257/504* (2013.01)
(58) Field of Classification Search
  CPC ........ B01D 2251/306; B01D 2251/604; B01D 2257/504; G01K 17/08
  USPC .......................................................... 702/130
  See application file for complete search history.

(56) References Cited

U.S. PATENT DOCUMENTS

| | | | |
|---|---|---|---|
| 4,322,224 A | 3/1982 | Roth | |
| 4,440,162 A | 4/1984 | Sewell et al. | |
| 5,902,043 A * | 5/1999 | Price | G01K 17/08 374/39 |
| 6,003,513 A | 12/1999 | Readey et al. | |
| 6,270,252 B1 | 8/2001 | Siefert | |
| 6,274,106 B1 | 8/2001 | Held | |
| 6,373,033 B1 * | 4/2002 | de Waard | G05B 13/027 219/483 |
| 6,618,687 B2 | 9/2003 | Warkander | |
| 7,987,849 B2 | 8/2011 | Heesch | |
| 2003/0074154 A1 | 4/2003 | Warkander | |
| 2003/0101006 A1* | 5/2003 | Mansky | B01J 19/0046 702/30 |
| 2012/0048273 A1 | 3/2012 | Gurr et al. | |
| 2013/0132003 A1* | 5/2013 | Toennesmann | G01F 1/684 702/45 |
| 2014/0345610 A1 | 11/2014 | Unger et al. | |
| 2015/0139269 A1* | 5/2015 | Kulkarni | G01K 17/00 374/33 |
| 2018/0010978 A1* | 1/2018 | Bailey | G01M 3/002 |

\* cited by examiner

TEMPERATURE-BASED ESTIMATION OF SCRUBBING CAPACITY OF A GAS SCRUBBER

CROSS-REFERENCE TO RELATED APPLICATION

This application claims the benefit of priority to U.S. provisional patent application Ser. No. 62/320,415, filed on Apr. 8, 2016.

FIELD OF THE INVENTION

This invention relates to gas scrubbers in general, and more particularly to a temperature-based method and system for estimating the scrubbing capacity of a gas scrubber, such as a $CO_2$ scrubber used in a re-breathing apparatus.

BACKGROUND

Closed-circuit re-breathers (CCRs) are used by divers, miners, firefighters and a variety of other personnel who must work under environmental conditions where breathable air is either unavailable or in short supply. Generally speaking, a CCR includes a carbon dioxide ($CO_2$) scrubber that removes the $CO_2$ produced by the person wearing the CCR. The $CO_2$ scrubber includes one or more substances that will "scrub", i.e. react with, the $CO_2$ in order to remove the $CO_2$ so that gas exiting the scrubber can be inhaled again by the person wearing the CCR. Since the removal of the $CO_2$ is critical, it is important for the user to know when the $CO_2$ scrubber is losing its ability to scrub the exhaled $CO_2$.

A variety of approaches have been used to determine the scrubbing capacity that remains in a CCR that is in use. For example, U.S. Pat. No. 4,154,586 (Jones) discloses a method in which the $CO_2$ scrubbing material changes color when it is spent. However, in underwater diving and fire-fighting applications, the user may not be able to see such a color change. Another approach is described in U.S. Pat. No. 4,146,887 (Magnante) where a temperature difference between the ambient environment and one location inside the scrubber is measured, and the measured temperature difference is used to predict and provide an "end-of-life" indication. However, variations in ambient conditions, e.g. temperature, can cause the end-of-life indication to come too early (the scrubber could continue to remove $CO_2$) or too late (the scrubber ceases to remove enough $CO_2$ before the indicated end-of-life) in the life of the scrubber.

Still another approach is described in U.S. Pat. No. 4,440,162 (Sewell) where temperature is measured at a predetermined location in the scrubber. When the temperature exceeds a pre-set value, an alarm is triggered. However, prior to the alarm, this approach does not provide the user with any way of knowing what the remaining capacity or utilized capacity of the $CO_2$ scrubber is. In addition, the temperatures in the reactive material will depend on the ambient temperature, thus resulting in alarms being provided when an alarm should not be given.

Since the endurance of a $CO_2$ scrubber varies with ambient temperature, ambient pressure and with a user's breathing rates, it is desirable to provide a user with updated capacity-information that has been generated by taking account of such operating parameters. However, the above-described prior art approaches are either impractical for certain applications, or do not provide such ongoing information.

Two known approaches exist that might give such desired ongoing information. U.S. Pat. No. 6,618,687 (Warkander) describes the use of temperature changes inside the space occupied by the $CO_2$ reactive material to give nearly continuous readings for remaining capacity; and EU patent EP 1316 331 B1 (Parker) describes a method that compares temperature readings to pre-determined temperature distribution characteristics. Both compare the temperature at predetermined locations to the warmest part of the reactive material. Such a comparison achieves reasonably good end-of-life predictions when the highest temperature remains steady. Unfortunately, the highest temperature does not remain steady. For example, in FIG. 3 of this document, the highest temperature is somewhat steady for Time=15% to Time=55%, but then the highest temperature drops until the reactive material reaches the limit of its ability to remove a sufficient amount of $CO_2$ (Time=100%).

Using the highest temperature to predict end-of-life may not be advisable for all types of scrubbers. For example, the method in Warkander and the method in Parker were developed with diving rebreathers, which tend to be less efficient than a rebreather for dry-land use. A low efficiency scrubber may last only half as long (i.e. 50%) as a high efficiency scrubber. In low efficiency scrubbers, $CO_2$ will reach its level of exhaustion before the highest temperature starts to decline. For instance, had the recordings in FIG. 3 come from a low efficiency scrubber instead of a high efficiency scrubber (and only lasted half as long), the reactive material would have been deemed exhausted at time=50% instead of at time=100%. At time=50% the highest temperature (at $T_9$) has still not peaked. In contrast, for high efficiency scrubbers, the highest temperature in the reactive material peaks before the reactive material is spent. Thus, the methods of determining the remaining capacity described in U.S. Pat. No. 6,618,687 and EP 1316 331 B1 will not work well for high efficiency scrubbers.

U.S. Pat. No. 7,987,849 (Heesch) describes a method for determining the consumption of a $CO_2$ scrubber in a patient's respirator using measurements of the patient's breathing and comparing it to an estimate of the scrubber's maximum capacity of $CO_2$ scrubbing. The maximum capacity of a $CO_2$ scrubber may be known fairly well for a patient being breathed quietly in an operating room with a controlled ambient temperature. However, for a rebreather that is used where the conditions vary, the efficiency of a scrubber may vary from under 20% to over 80% of its maximum (theoretical) capacity (Nuckols et al., *Life Support Systems Design*; Simon and Schuster Custom Publishing, Needham Heights, M A 1996. ISBN 0-536-59616-6). Given this range of efficiencies, Heesch's method will not be accurate enough for many uses. For example, in underwater diving, the workload of the diver, ambient temperature range and ambient pressure range can vary significantly.

U.S. Patent Application 2014/0345610 (Unger) describes a method wherein a consumption indicator, consisting of a melting material, measures the total reaction heat, which is purported to be related to the consumption of reactive material. However, the temperature of the reactive material is, in practice, almost unaffected by the work rate ($CO_2$ production) of the wearer. Therefore, such a consumption indicator will not work well in many situations.

U.S. Pat. No. 6,003,513 (Readey) describes a system that provides a general idea of the life of the reactive material based on where "localized heating" takes place. However, all of Readey's temperature sensors (shown as temperature strip 100 in Readey's FIG. 2) are placed in the flow of gas that is about to enter the reactive material. Readey's temperature sensors are not in contact with the canister or the reactive material. Therefore, they will read the temperature of the gas, but not the temperature of the reactive material. In addition, Readey's FIG. 8 shows that the temperature profile is assumed to have a local maximum that travels downstream as the reactive material is consumed. As is illustrated in the present FIG. 3 below, the temperatures in an actual scrubber do not show such a local maximum. Readey does not explain how the position of the local maximum relates to the $CO_2$ level in the exhaust gas, the key end-of-life determinator. Therefore, Readey's method is inaccurate, and thus will not provide a reliable indication of remaining capacity and will not work well.

Since the endurance of a $CO_2$ scrubber varies with ambient temperature, ambient pressure and with a user's breathing rates, and it is desirable to provide a user with updated capacity-information that has been generated by taking into account such operating parameters as to the remaining capacity or utilized capacity of the $CO_2$ scrubber, which is something that the above-described prior art approaches do not do.

SUMMARY OF THE INVENTION

The invention may be embodied as a method. In one such method, the scrubbing capacity, which may be the capacity utilized or the capacity remaining, of a gas scrubber (e.g. a $CO_2$ scrubber) is estimated. For example, a method according to the invention may include the following steps:
(a) providing a gas scrubber having a canister with reactive material inside the canister, and further having a plurality of temperature sensors at different locations along a gas flow path that extends from an entrance to an exit of the canister;
(b) causing gas to flow through the canister so that the gas contacts the reactive material and thereby causes an exothermic or endothermic reaction (a "Thermic" reaction) to occur between the gas and the reactive material;
(c) during a time period, taking a reading from each of the temperature sensors to provide a temperature indication for each of the temperature sensors;
(d) storing the temperature indications;
(e) repeating steps c and d for other time periods until a desired number of time periods have occurred;
(f) for each time period, using the stored temperature indications, determining a temperature difference for each adjacent pair of temperature sensors to provide a set of temperature differences;
(g) using the sets, for each pair of adjacent temperature sensors, selecting a largest of the temperature differences ("$T_L$");
(h) for each pair of adjacent temperature sensors, selecting a recent one of the time periods and dividing each temperature difference in that time period by the corresponding $T_L$ to provide a normalized temperature difference for each pair of adjacent temperature sensors;
(i) combining the normalized temperature differences to provide a comparison value;
(j) comparing the comparison value to a threshold value to provide a life-value that is indicative of a difference between the comparison value and the threshold value;
(k) providing the life-value to a user.

Step "k" may include displaying a visual representation of the life-value as:
(1) an indication of scrubbing capacity utilized, or
(2) an indication of scrubbing capacity remaining, or
(3) a remaining time of use.

Step "i" may include:
(1) adding at least one of the normalized temperature differences to another of the normalized temperature differences; and/or
(2) mathematically weighting at least one of the normalized temperature differences to provide at least one weighted-normalized temperature difference; and/or
(3) adding at least one of the weighted-normalized temperature differences to another of the weighted-normalized temperature differences or to one of the normalized temperature differences; and/or
(4) selecting weighting factors for one or more of the normalized temperature differences.

The invention may be embodied as a gas scrubber having a system for estimating the remaining scrubbing capacity or the utilized scrubbing capacity of a gas scrubber (e.g. a $CO_2$ scrubber). For example, such a gas scrubber may include the following:
a canister having reactive material therein;
a plurality of temperature sensors within the canister and located at different locations along a gas flow path that extends from an entrance to an exit of the canister; and
a micro-processor programmed to do the following while gas flows through the canister so that the gas contacts the reactive material and thereby causes an exothermic or endothermic reaction to occur:
(a) during a time period, take a reading from each of the temperature sensors to obtain a temperature indication for each of the temperature sensors;
(b) store the temperature indications;
(c) repeat steps a and b for other time periods until a desired number of time periods have occurred;
(d) for each time period, using the stored temperature indications, determine a temperature difference for each adjacent pair of temperature sensors to provide a set of temperature differences;
(e) using the sets, for each pair of adjacent temperature sensors, select a largest of the temperature differences ("$T_L$");
(f) for each pair of adjacent temperature sensors, select a recent one of the time periods and divide each temperature difference in that time period by the corresponding $T_L$ to provide a normalized temperature difference for each pair of adjacent temperature sensors;
(g) combine the normalized temperature differences to provide a comparison value;
(h) compare the comparison value to a threshold value to provide a life-value that is indicative of a difference between the comparison value and the threshold value;
(i) provide the life-value to a user.

A system according to the invention may also include a display (e.g. a numeric display) that is capable of receiving the life-value, and displaying the life-value as:
(1) an indication of scrubbing capacity utilized, or
(2) an indication of scrubbing capacity remaining, or
(3) a remaining time of use.

The program executed by the microprocessor in accordance with step "g" may cause the microprocessor to:
(1) add at least one of the normalized temperature differences to another of the normalized temperature differences; and/or
(2) mathematically weight at least one of the normalized temperature differences to provide at least one weighted-normalized temperature differences; and/or (3) add at least one of the weighted-normalized temperature differences to another of the weighted-normalized temperature differences or to one of the normalized temperature differences; and/or (4) select weighting factors for one or more of the normalized temperature differences.

BRIEF DESCRIPTION OF THE DRAWINGS

Embodiments of the invention are further described with reference to the following description and to the drawings, wherein corresponding reference characters indicate corresponding parts throughout the several views of the drawings and wherein.

DETAILED DESCRIPTION

Figure 1:
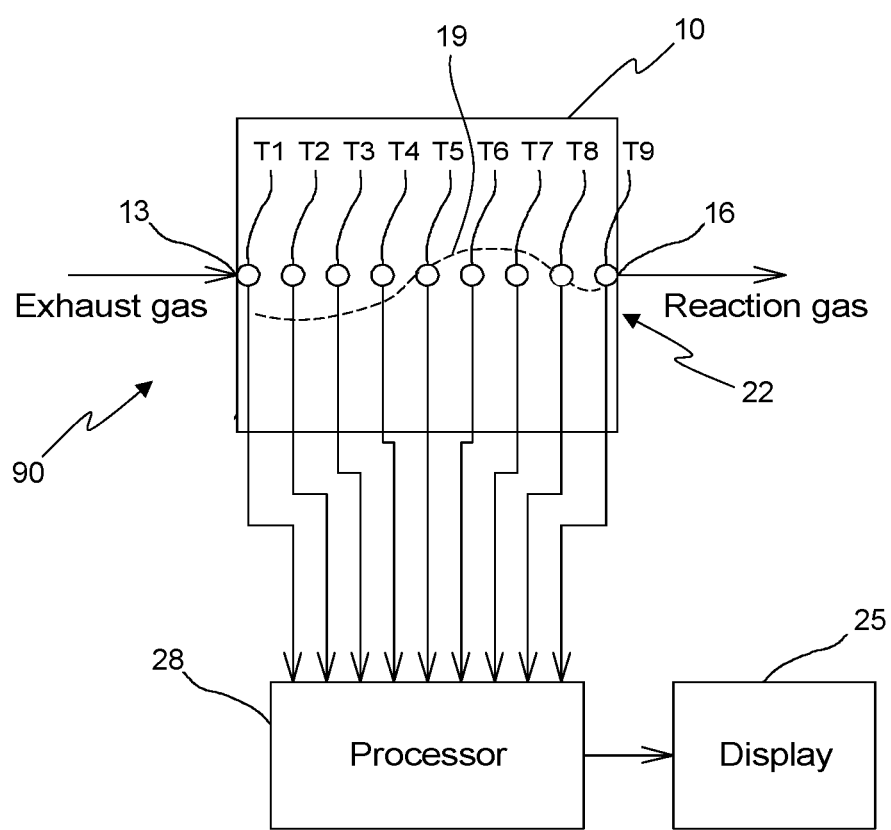
FIG. 1 is a functional block diagram of a $CO_2$ scrubber of a re-breathing system instrumented to carry out a method of estimating the scrubbing capacity of the $CO_2$ scrubber in accordance with an embodiment of the present invention.

Generally speaking the invention may be embodied as a method or a system for estimating the scrubbing capacity of a gas scrubber that scrubs a gas, such as carbon dioxide ("$CO_2$") via a Thermic reaction, from an exhaust gas. Exhaust gas may be made to flow through a canister 10 that contains a material that chemically binds or transforms the gas as that gas flows from an inlet 13 of the canister 10 toward an outlet 16 of the canister 10 along a flow path 19. The material inside the canister 10 causes a Thermic reaction to occur so that scrubbed gas that exits the canister 10 via the outlet 16 includes a lower concentration of the gas component that reacts with the reactive material.

A plurality of temperature sensors 22 may be distributed along the flow path 19. The temperature sensors 22 may include a first temperature sensor 22 ($T_1$) positioned at the canister's inlet 13 and subsequent temperature sensors 22 ($T_2$-$T_9$) spaced along the flow path 19. At a plurality of times, temperatures at each temperature sensor 22 are measured and the temperature differences between adjacent pairs of sensors 22 are calculated. For each pair, the largest of those measured temperature differences is identified. The normalized temperature difference for each pair at a particular time is calculated as the temperature difference at that time for that pair divided by the largest difference for that pair. These normalized temperature differences may be combined to provide an estimate of the remaining scrubbing capacity or utilized scrubbing capacity of the reactive material. Such an estimate is referred to herein as a "life-value." For example, a weighted average of the normalized temperature differences may be calculated and used to provide a life-value, which can then be used to determine the predicted remaining capacity or estimated utilized capacity of the gas scrubber. In some embodiments of the invention, weighting factors may be selected for particular pairs of temperature sensors based on experimentally-determined relationships between the normalized temperature differences and the remaining scrubbing capacity or utilized scrubbing capacity. In this manner, some of the temperature differences may be given more influence than others of the temperature differences. The remaining scrubbing capacity or utilized scrubbing capacity can be represented visually on a display 25 as a percentage of an initial scrubbing capacity or a final scrubbing capacity, and/or as the time remaining at the current rate of use.

Accordingly, embodiments of the present invention may be a method of estimating the remaining scrubbing capacity or the utilized scrubbing capacity of a gas scrubber. In addition, embodiments of the present invention may be a method or system of providing a visual display of the remaining scrubbing capacity or utilized scrubbing capacity of a gas scrubber that scrubs a gas during a Thermic reaction. Further, embodiments of the present invention may be a method of or system for estimating the remaining scrubbing capacity or utilized scrubbing capacity of a $CO_2$ scrubber. Also, embodiments of the present invention may be a method of or system for estimating the remaining scrubbing capacity or utilized scrubbing capacity of a gas scrubber (e.g. a $CO_2$ scrubber) in a way that is nearly independent of ambient conditions. The present invention may provide a method of determining and visually displaying the approximate remaining scrubbing capacity or utilized scrubbing capacity of a $CO_2$ scrubber used in a re-breathing system.

In order to describe the invention and provide additional information by which to understand the invention, a particular embodiment of the invention is described below, which is a $CO_2$ scrubber. However, it should be noted that the invention is not limited to a $CO_2$ scrubber, or a scrubber in which an exothermic reaction takes place. For example, the invention may be embodied as a scrubber in which an endothermic reaction occurs. Referring now to the drawings, and more particularly to FIG. 1, a $CO_2$ scrubber 90 of a re-breathing system is illustrated. Reactive material, such as sodium hydroxide or calcium hydroxide, in the canister 10 receives gas (i.e., exhaled breath) and exothermically reacts with the received gas along a flow path 19 between inlet 13 and outlet 16 to produce a reaction gas, which leaves the canister 10 via the outlet 16. During its useful life, the reactive material in the canister 10 outputs a reaction gas that is sufficiently free of $CO_2$. This reaction gas is then available for use by the re-breathing system. For example, the reaction gas may be provided to the individual using the rebreather.

It is to be understood that the particular chemical composition of the reactive material, style of packaging (e.g. granular or extruded) and use of the reaction gas may be different from that described herein.

During the effective life of the reactive material, Thermic reaction takes place within canister 10. It is to be understood that while the present invention will be described herein relative to a $CO_2$ scrubber, the present invention can be used in conjunction with other types of scrubbers that produce an exothermic or endothermic reaction.

The canister 10 with reactive material inside is disposed in a flow of the exhaust gas such that the exhaust gas flows into an inlet 13 of the canister 10 and flows through along a flow path 19. Inside the canister 10, a reaction gas is produced by the exothermic reaction or endothermic as the case may be, and exits the canister 10 at an outlet 16 thereof.

Figure 3:
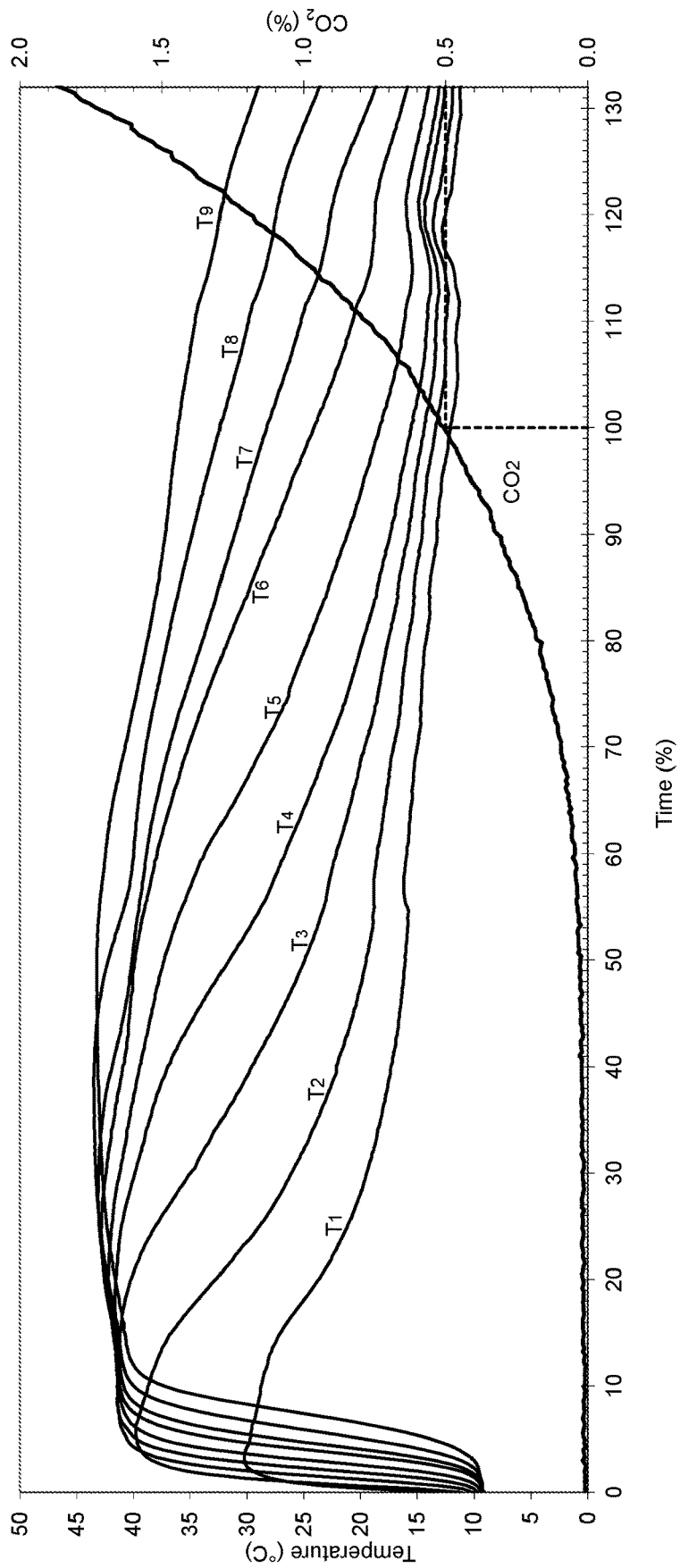
FIG. 3 is a plot of the $CO_2$ level in the outlet gas and the temperatures in nine locations inside a high efficiency $CO_2$ scrubber vs. time. The data produced by the nine temperature sensors are labeled $T_1$ through $T_9$, where $T_1$ is at an entrance to a canister containing the reactive material and $T_9$ is at an exit of an canister. The ambient temperature was 5° C. The time axis is scaled to show 100% at a $CO_2$ level of 0.5%, a commonly used definition of scrubber exhaustion.

A plurality of temperature sensors 22 may be distributed along the flow path 19. As an example, temperatures detected by the sensors 22 ($T_1$-$T_9$) are shown in FIG. 3. With regard to the data used to create FIG. 3, at the beginning of use (time=0%), all the reactive material was at the same temperature (approximately 9° C.). As the $CO_2$ rich gas began to enter the canister 10, the temperature at the first sensor 22 ($T_1$) increased, and subsequently the temperatures of the other sensors 22 also increased as a result of the reactions taking place between the reactive material and the $CO_2$. After a short time (here at about time=3%) the temperature at $T_1$ reaches a maximum and it gradually decreases towards the temperature of the gas entering the canister 10. The temperatures at sensors $T_2$ through $T_9$ rise quickly, and each one reaches a peak.

Figure 4:
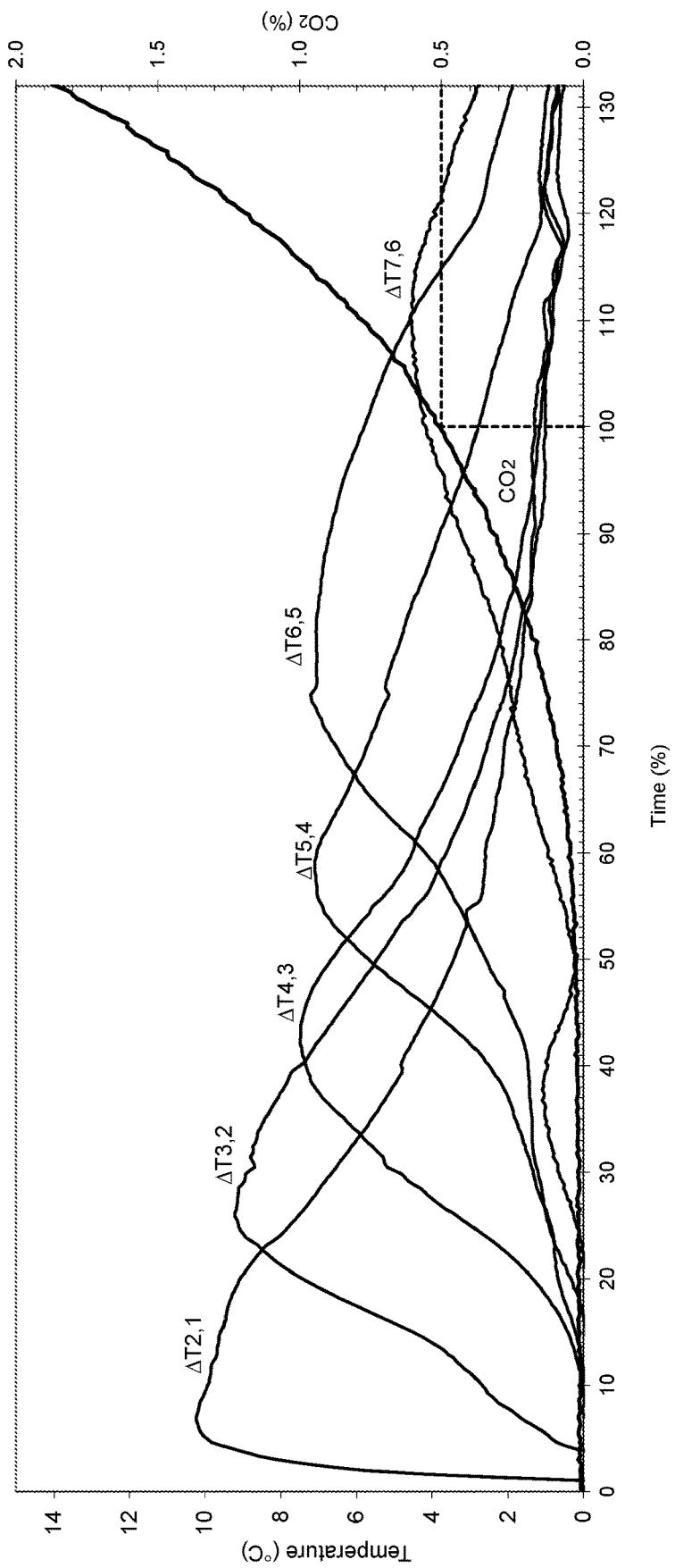
FIG. 4 is a plot of the temperature difference between adjacent pairs of temperature sensors using the same data that was used to generate the plots in FIG. 3. As an example, $\Delta T_{2,1}$ is the temperature difference between sensor $T_2$ and sensor $T_1$ (i.e. $T_2-T_1$). The other temperature differences are calculated in similar ways.

By calculating the temperature difference between two adjacent temperature sensors (e.g. $T_1$ and $T_2$, or $T_2$ and $T_3$, or $T_3$ and $T_4$ or $T_4$ and $T_5$) a measure of the chemical activity of the reactive material in the area between those two temperature sensors can be obtained. FIG. 4 shows the temperature difference between adjacent temperature sensors 22 as calculated by the processor 28. As the reactive material in a section becomes spent, the temperature difference of the temperature sensors 22 on either side of that section decreases. That temperature difference will approach zero if the reactive material is completely spent. It will also be zero if there is no $CO_2$ present in the gas.

Figure 5:
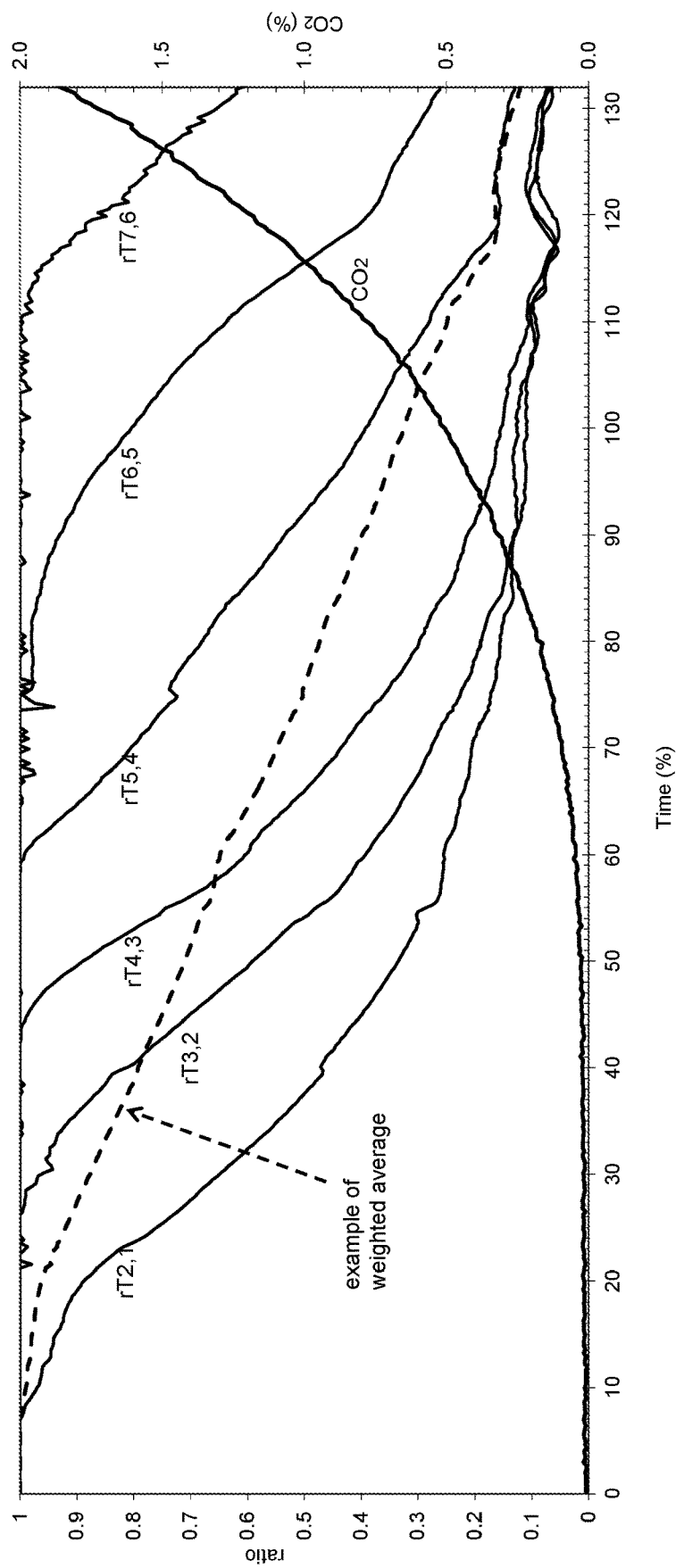
FIG. 5 is a plot of the normalized temperature differences for each pair of sensors using the same data that was used to generate the plot in FIG. 4. The black, dashed line shows an example of a weighted average.

While gas is flowing through the canister 10, the largest difference in temperature in each section (e.g. $\Delta T_{2,1\ max}$) is determined frequently by the processor 28. The relative activity (r) of each section may be calculated by the processor 28. For example, a normalized temperature difference may be a good indicator of the relative activity within a section. Such a normalized temperature difference may be calculated by dividing the current temperature difference for each pair of temperature sensors 22 by its own maximum temperature difference (e.g. $rT_{2,1}=\Delta T_{2,1}/\Delta T_{2,1\ max}$). In this usage, the "maximum temperature difference" is the maximum since the reactive material was initially put into service. This nuance may be important because the useful life of the reactive material may occur over multiple use-sessions. That is to say that, use of the scrubber (and therefore, the reactive material) may be intermittent, and in that situation, the maximum temperature difference may have occurred during a prior use-session. Using the data of FIG. 3 and FIG. 4, the relative activity for each section may be determined by the processor 28. FIG. 5 shows the plots of that relative activity.

Figure 2A:
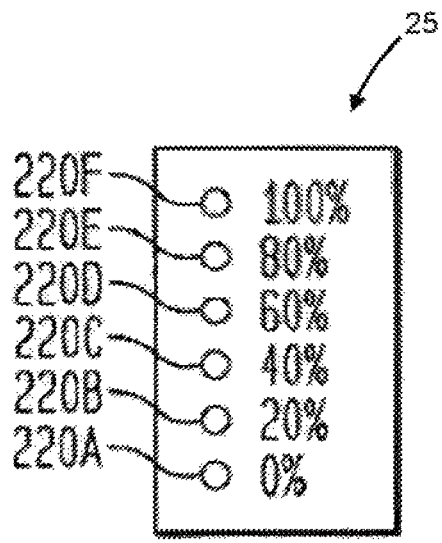
FIG. 2A is a schematic view of a display that can be used to visually represent the remaining scrubbing capacity or the utilized scrubbing capacity.
Figure 2B:
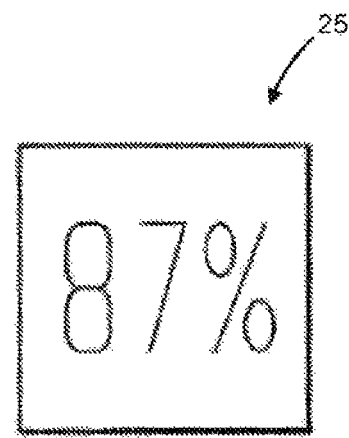
FIG. 2B is a schematic view of a display that can be used to visually represent the remaining scrubbing capacity or utilized scrubbing capacity numerically.
Figure 2C:
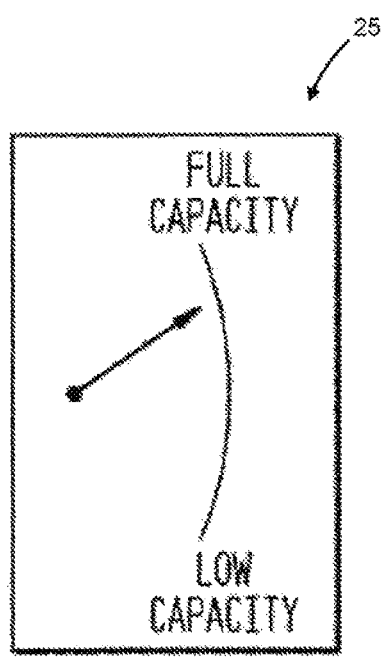
FIG. 2C is a schematic view of an analog display that can be used to visually represent the remaining scrubbing capacity or utilized scrubbing capacity.
Figure 6:
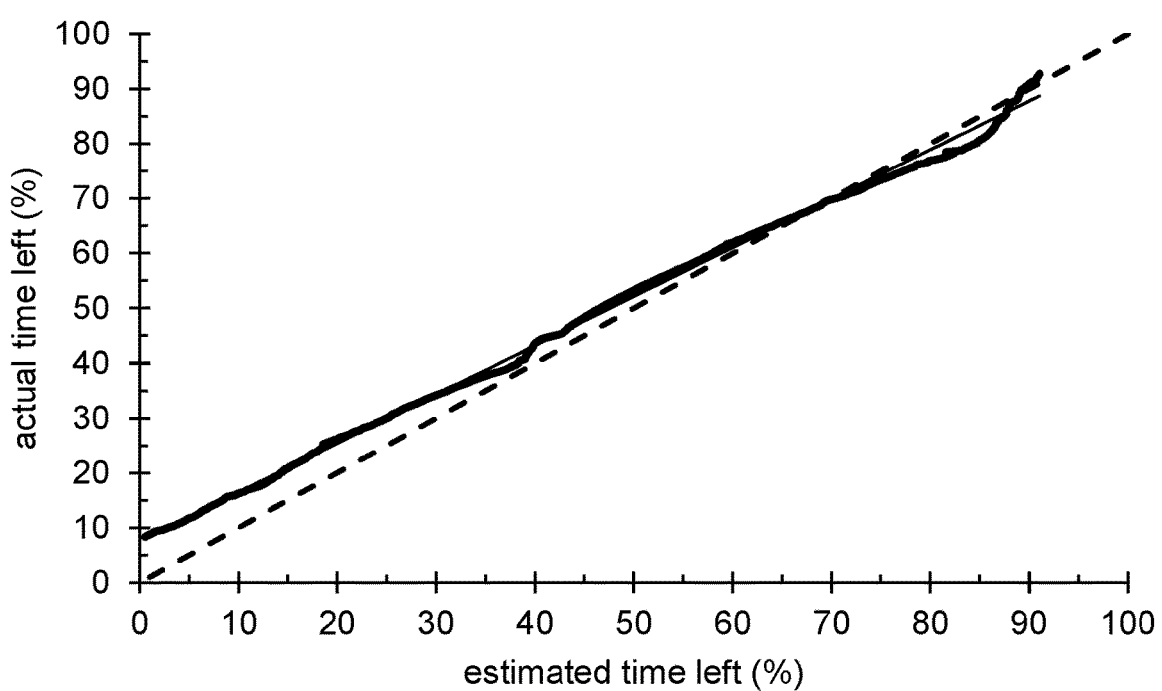
FIG. 6 is a plot of the estimated time left (gauge reading) vs. the actual time left. The black, dashed line shows the ideal line.

A weighted average of these ratios may be calculated. FIG. 5 depicts the results of an example of such ratios where the weighting factor for $rT_{2,1}$ was 1, for $rT_{3,2}$ it was 0.5, for $rT_{5,4}$ it was 1, for $T_{6,5}$ it was 0.5 and the other factors were 0 (i.e., not used). By adjusting the weighting factors it is possible to obtain a weighted average that has a consistent and fairly linear drop when plotted against time. Curve fitting techniques can be applied to straighten such a line. The gauge, such as those depicted in FIGS. 2A, 2B and 2C, may be configured to indicate that no capacity remains when the weighted average has reached a chosen value. In FIG. 5, that chosen value for the ratio could be just over 0.3 because in this example that is when the $CO_2$ concentration in the gas leaving the reactive material exceeds the commonly used value of 0.5%. Using the weighted average and the chosen ratio value, and applying a third order polynomial fit (or other curve fitting technique), a corresponding gauge reading can be obtained. The dashed line in FIG. 6 shows an example of such a gauge reading; the actual time left is plotted against the estimated time left. A safety margin of, say, 10% may be included in the reading and the plot in FIG. 6 has such a safety margin, i.e. there would actually be about 10% capacity left when the gauge read 0%.

When data from tests at different ambient temperatures, wearer workloads, different reactive materials, and atmospheric pressures are plotted together, the weighting factors may be adjusted until a close prediction of the endurance time is obtained. Also, a desired safety margin can be determined, and the gauge adjusted to avoid excessive $CO_2$ remaining in the gas that leaves the canister 10. FIG. 6 shows a third order polynomial, which is simple and works well. Other curve fitting techniques may be used. However, in some extreme environments, the average function may indicate remaining capacity when little or none remains. Thus, in these applications, it may be desirable to use calibration curves/functions that provide for the "safest" level of operation. If a system is calibrated for such an extreme environment, but used in an average environment, then the reactive material could have remaining scrubbing capacity when the display 25 indicated zero capacity. This can be considered as a desired safety factor.

From FIG. 5, it should be noted that there is a period in the beginning of that test (time<8%) where the weighted average is constant and doesn't provide much information. In that period of time, a display 25 may show the (rising) temperature in the reactive material to confirm that there is activity in the reactive material, either as the temperature itself and/or in the form of a phrase such as "warming up". If the temperature difference between all probes is small (e.g. a few degrees) then the display 25 can show "no activity". This situation would occur if somebody is not breathing through the scrubber or if no reactive material is present.

The temperature of the reactive material may be influenced by the ambient temperature. However, by calculating the temperature difference between two sensors the effect of ambient temperature is reduced. The temperature of the reactive material may also vary with the heat capacity of the gas (i.e. type of gas, such as air or $O_2$) and barometric pressure in the canister 10. It may also depend on the $CO_2$ partial pressure in the exhaust gas. By calculating the relative activity of a section in the canister 10, the influences of the heat capacity of the exhaust gas and the $CO_2$ partial pressure are minimized since they are essentially constant. The combining the normalized temperature differences and/or weighted-normalized temperature difference, for example, by use of a weighted average, the relative activity in several sections in the canister 10 is combined. Such a system and/or method is suitable for use with high efficiency scrubbers.

The geometry and flow patterns of scrubbers may differ. Therefore, the exact placement of temperature sensors may depend on the particular scrubber being utilized. People skilled in the art will realize that the number of temperature sensors utilized can be different than that described herein, and that the choice of weighting factors may change the accuracy of the indication provided by the gauge.

Most CCRs have condensation forming inside them, and those used for diving may leak. The temperature sensors 22 can also be used to indicate the presence of such water in the reactive material, because there would be reduced or no chemical activity in wet parts of the reactive material. It is likely that the temperature in wet parts of the reactive material would be far lower than in the dry reactive material and the processor 28 may be programmed to recognize such a low temperature situation, and then indicate to the user that water is present.

Since temperature increases in a $CO_2$ scrubber 90 may vary depending on ambient pressure, ambient temperature, the amount of $CO_2$ in the exhaust gas and the wearer's breathing rate, it may be necessary to provide and use calibration curves/functions for specific applications and/or operating environments, and then cause the processor 28 to execute a particular program corresponding to those applications and/or environments cause accordingly. Further, it may be necessary to combine a number of calibration curves/functions to yield an average function which, in the average usage, will provide the user with a "safe" indication of remaining scrubbing capacity.

Figure 7:
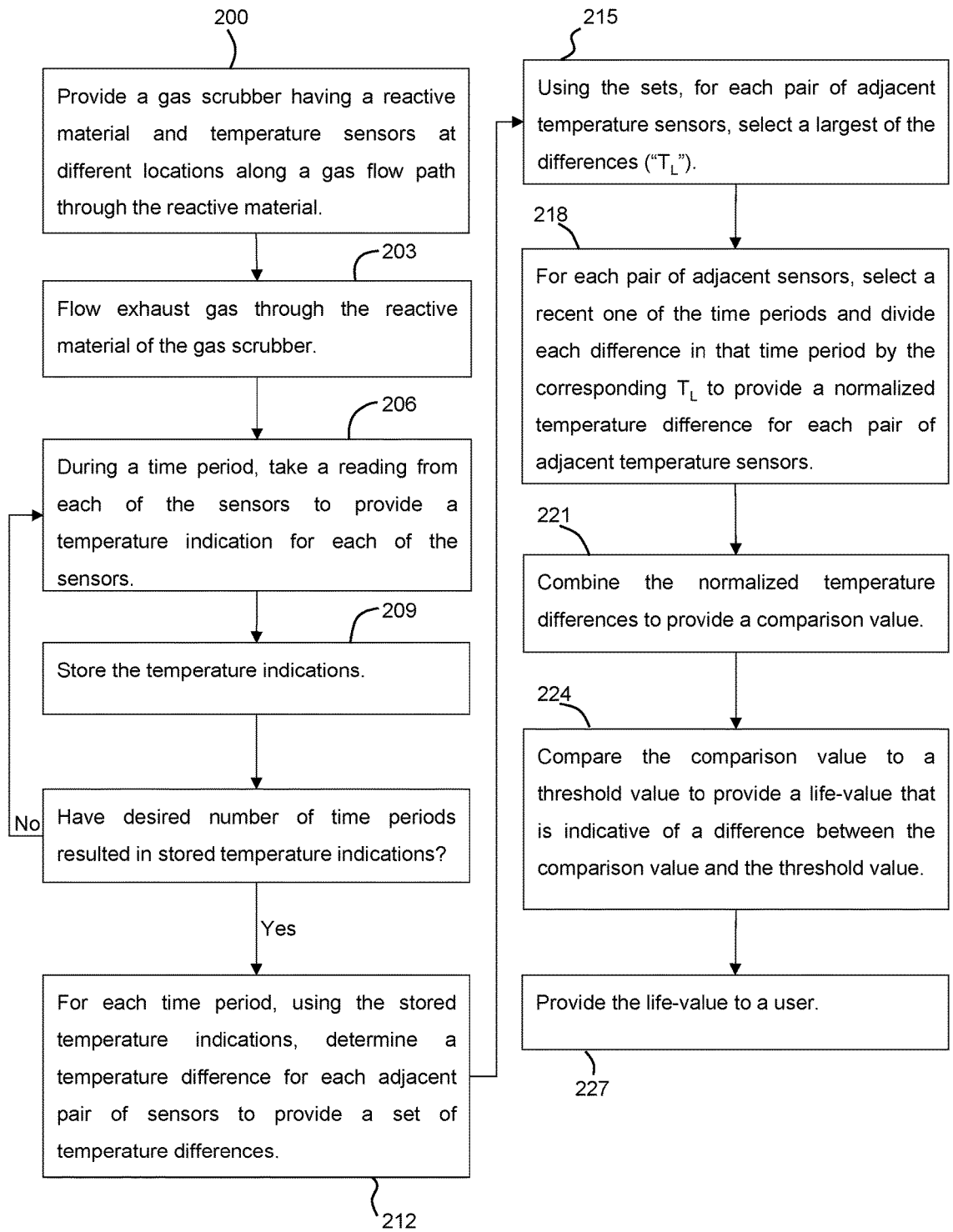
FIG. 7 is a flow chart illustrating a method according to the invention.

In describing the systems above that are in keeping with the invention, methods that are in keeping with the invention have also been described. FIG. 7 is provided in order illustrate and outline primary features of one of those methods. In that method, a gas scrubber is provided (200). The gas scrubber has a reactive material and temperature sensors at different location along a gas flow path through the reactive material. Exhaust gas is flowed (203) through the reactive material. During a time period, a reading is taken (206) from each of the sensors to provide a temperature indication for each of the sensors. The temperature indications for that time period are stored (209). Steps (206) and (209) are repeated until a desired number of time periods have produced stored temperature indications. For each time period, using the stored temperature indications, a temperature difference is determined (212) for each adjacent pair of sensors to provide a set of temperature differences. Using the sets, for each pair of adjacent temperature sensors, select (215) a largest of the differences ("$T_L$"). For each pair of adjacent sensors, select a recent one of the time periods and divide (218) each difference in that time period by the corresponding $T_L$ to provide a normalized temperature difference for each pair of adjacent temperature sensors. Combine (221) the normalized temperature differences to provide a comparison value. Compare (224) the comparison value to a threshold value to provide a life-value that is indicative of a difference between the comparison value and threshold value. Provide (227) the life-value to a user.

In one variation of such a method, one or more of the normalized temperature differences are weighted, for example by multiplying the normalized temperature difference by a predetermined number, and then for those that have been weighted, the weighted-normalized temperature difference is used in the step 221, rather than the corresponding normalized temperature difference. The resulting comparison value may be said to be "influenced" more by those normalized temperature differences having a predetermined number greater than one, and "influenced" less by those normalized temperature differences having a predetermined number less than one.

The advantages of the present invention are numerous. The method and system can be used to provide a more accurate and ongoing indication of the remaining scrubbing capacity or utilized scrubbing capacity of a gas scrubber that produces an exothermic reaction or endothermic reaction. Thus, the user is not forced to react prematurely to a last-minute, end-of-life alarm, but is instead given ample notice as to when the scrubber's end-of-life is expected. This is especially important when the present invention is applied to $CO_2$ scrubbers used in re-breathing systems. Through the use of the methods described herein, the estimate of remaining scrubbing capacity or utilized scrubbing capacity is nearly independent of ambient conditions. Further, the present invention can be adapted to a variety of exothermic or endothermic reaction type gas scrubbers. Still further, a variety of operating environments, reactive materials and styles of packing the reactive material, can be accommodated merely by providing relevant calibration curves/functions.

Although the invention has been described relative to specific embodiments thereof, the invention is not limited to such embodiments. Hence, the present invention is deemed limited only by the appended claims and the reasonable interpretation thereof.

What is claimed is:

1. A method of estimating scrubbing capacity of a gas scrubber, comprising:
   (a) providing a gas scrubber having a canister with reactive material inside the canister, and further having a plurality of temperature sensors at different locations along a gas flow path;
   (b) causing gas to flow through the canister so that the gas contacts the reactive material and thereby causes a Thermic reaction to occur between the gas and the reactive material;
   (c) during a time period, taking a reading from each of the temperature sensors to provide a temperature indication for each of the temperature sensors;
   (d) storing the temperature indications;
   (e) repeating steps c and d for other time periods until a desired number of time periods have occurred;
   (f) for each time period, using the stored temperature indications, determining a temperature difference for each adjacent pair of temperature sensors to provide a set of temperature differences;
   (g) using the sets, for each pair of adjacent temperature sensors, selecting a largest of the temperature differences ("$T_L$");
   (h) for each pair of adjacent temperature sensors, selecting a recent one of the time periods and dividing each temperature difference in that time period by the corresponding $T_L$ to provide a normalized temperature difference for each pair of adjacent temperature sensors;
   (i) combining the normalized temperature differences to provide a comparison value;
   (j) comparing the comparison value to a threshold value to provide a life-value that is indicative of a difference between the comparison value and the threshold value;
   (k) providing the life-value to a user.

2. The method of claim 1, wherein providing the life-value includes displaying a visual representation of the life-value as an indication of scrubbing capacity utilized.

3. The method of claim 1, wherein providing the life-value includes displaying a visual representation of the life-value as an indication of scrubbing capacity remaining.

4. The method of claim 1, wherein providing the life-value includes displaying a visual representation of the life-value as a remaining time of use.

5. The method of claim 1, wherein step "i" includes adding at least one of the normalized temperature differences to another of the normalized temperature differences.

6. The method of claim 1, wherein step "i" includes mathematically weighting at least one of the normalized temperature differences to provide at least one weighted-normalized temperature difference.

7. The method of claim 6, wherein step "i" includes adding at least one of the weighted-normalized temperature differences to another of the weighted-normalized temperature differences or to one of the normalized temperature differences.

8. The method of claim 6, wherein step "i" includes selecting weighting factors for one or more of the normalized temperature differences.

9. The method of claim 1, wherein the gas scrubber is a $CO_2$ gas scrubber.

10. A gas scrubber, comprising:
a canister having reactive material therein;
a plurality of temperature sensors within the canister and located at different locations along a gas flow path;
a micro-processor programmed to do the following while gas flows through the canister so that the gas contacts the reactive material and thereby causes an exothermic or endothermic reaction to occur:
 (a) during a time period, take a reading from each of the temperature sensors to obtain a temperature indication for each of the temperature sensors;
 (b) store the temperature indications;
 (c) repeat steps a and b for other time periods until a desired number of time periods have occurred;
 (d) for each time period, using the stored temperature indications, determine a temperature difference for each adjacent pair of temperature sensors to provide a set of temperature differences;
 (e) using the sets, for each pair of adjacent temperature sensors, select a largest of the temperature differences ("$T_L$");
 (f) for each pair of adjacent temperature sensors, select a recent one of the time periods and divide each temperature difference in that time period by the corresponding $T_L$ to provide a normalized temperature difference for each pair of adjacent temperature sensors;
 (g) combine the normalized temperature differences to provide a comparison value;
 (h) compare the comparison value to a threshold value and providing a life-value that is indicative of a difference between the comparison value and the threshold value;
 (i) provide the life-value to a user.

11. The gas scrubber of claim 10, further including a numeric display capable of receiving the life-value, and displaying the life-value as an indication of scrubbing capacity utilized.

12. The gas scrubber of claim 10, further including a numeric display capable of receiving the life-value, and displaying the life-value as an indication of scrubbing capacity remaining.

13. The gas scrubber of claim 10, further including a display capable of receiving the life-value, and displaying the life-value as a remaining time of use.

14. The gas scrubber of claim 10, wherein step "g" includes adding at least one of the normalized temperature differences to another of the normalized temperature differences.

15. The gas scrubber of claim 10, wherein step "g" includes mathematically weighting at least one of the normalized temperature differences to provide at least one weighted-normalized temperature difference.

16. The gas scrubber of claim 15, wherein step "g" includes adding at least one of the weighted-normalized temperature differences to another of the weighted-normalized temperature differences or to one of the normalized temperature differences.

17. The gas scrubber claim 15, wherein step "g" includes selecting weighting factors for one or more of the normalized temperature differences.

18. The gas scrubber of claim 10, wherein the gas scrubber is a $CO_2$ gas scrubber.

* * * * *